(12) United States Patent
Sardino et al.

(10) Patent No.: US 11,429,871 B2
(45) Date of Patent: Aug. 30, 2022

(54) DETECTION OF DATA OFFLOADING THROUGH INSTRUMENTATION ANALYSIS

(71) Applicant: International Business Machines Corporation, Armonk, NY (US)

(72) Inventors: Nicholas P. Sardino, Hyde Park, NY (US); Anthony Sofia, Hopewell-Junction, NY (US); Robert W. St. John, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1035 days.

(21) Appl. No.: 15/598,578

(22) Filed: May 18, 2017

(65) Prior Publication Data

US 2018/0336473 A1 Nov. 22, 2018

(51) Int. Cl.
*G06N 5/02* (2006.01)
*G06F 9/50* (2006.01)
*G06F 16/25* (2019.01)
*G06F 16/2455* (2019.01)

(52) U.S. Cl.
CPC .............. *G06N 5/02* (2013.01); *G06F 9/505* (2013.01); *G06F 16/24568* (2019.01); *G06F 16/254* (2019.01); *G06F 2209/508* (2013.01); *G06F 2209/509* (2013.01)

(58) Field of Classification Search
CPC .... G06F 17/30; G06F 15/173; G06F 11/2048; G06F 16/256; G06F 16/24568; G06F 16/254; G06F 9/505; G06F 2209/508; G06F 2209/509; B25J 15/0014; B65G 1/0492; G02B 6/3882; G06N 5/02; G06N 7/005; Y10S 707/99936
See application file for complete search history.

(56) References Cited

U.S. PATENT DOCUMENTS

| | | | |
|---|---|---|---|
| 8,514,704 B2 | 8/2013 | Fraccalvieri et al. | |
| 8,751,438 B2 | 6/2014 | Kharod et al. | |
| 9,020,901 B2 | 4/2015 | Chi et al. | |
| 9,251,227 B2 | 2/2016 | Grasselt et al. | |
| 9,414,222 B1 * | 8/2016 | Dixon | H04L 67/325 |
| 9,483,309 B2 | 11/2016 | Fankhauser et al. | |
| 2002/0107838 A1 * | 8/2002 | Tsai | G06F 16/951 |
| 2005/0228728 A1 * | 10/2005 | Stromquist | G06Q 40/12 |
| | | | 705/30 |

(Continued)

OTHER PUBLICATIONS

'Optimizing of workload of ETL jobs based on resource availability on dependent Source, Target and ETL Infrastructure' 2013.*

(Continued)

*Primary Examiner* — Michael J Huntley
*Assistant Examiner* — Peter D Coughlan
(74) *Attorney, Agent, or Firm* — Cantor Colburn LLP; Edward Wixted

(57) ABSTRACT

Embodiments include techniques for detection of data offloading through instrumentation analysis, where the techniques include monitoring, via a processor, an execution of a job, and analyzing processes associated with the job to determine a pattern. The techniques also include determining whether the pattern of the job is associated with a pattern for a workload type, and classifying the job based at least in part on the determination.

13 Claims, 3 Drawing Sheets

(56) References Cited

U.S. PATENT DOCUMENTS

| | | | | |
|---|---|---|---|---|
| 2006/0277155 | A1* | 12/2006 | Bell | G06F 16/256 |
| 2009/0210444 | A1* | 8/2009 | Bailey | G06Q 30/02 |
| 2011/0313969 | A1 | 12/2011 | Ramu | |
| 2014/0040182 | A1* | 2/2014 | Gilder | G06Q 40/12 |
| | | | | 707/602 |
| 2014/0089251 | A1 | 3/2014 | Bhide et al. | |
| 2015/0134795 | A1 | 5/2015 | Theimer et al. | |
| 2016/0036722 | A1* | 2/2016 | Obrecht | G06F 21/554 |
| | | | | 709/226 |
| 2016/0179891 | A1 | 6/2016 | Bowman et al. | |
| 2016/0226955 | A1* | 8/2016 | Moorthi | H04L 67/10 |
| 2017/0132296 | A1* | 5/2017 | Ding | G06F 16/248 |
| 2018/0026904 | A1* | 1/2018 | Van De Groenendaal | |
| | | | | G06F 3/0688 |
| | | | | 709/226 |

OTHER PUBLICATIONS

Disclosed Anonymously, "A method to quickly configure the parallel setting for ETL data from/to a database," ip.com, IP.com No. IPCOM000245266D, Publication Date: Feb. 24, 2016; 5 pages.

Disclosed Anonymously, "Optimizing of workload of ETL jobs based on resource availability on dependent Source, Target and ETL Infrastructure", ip.com, IP.com No. IPCOM000230005D, Publication Date: Aug. 13, 2013, 7 pages.

\* cited by examiner

DETECTION OF DATA OFFLOADING THROUGH INSTRUMENTATION ANALYSIS

BACKGROUND

The present invention generally relates to data management, and more specifically, to detecting data offloading through instrumentation analysis.

In today's environment, enterprises can store and retrieve data from one or more sources where the data can be provided in various formats and standards. In many instances, the data can be consolidated in a single platform called a data lake or data warehouse. Large volumes of data can be transferred from a source platform to a target platform through a process called extract, transform, and load (ETL) in order to aggregate the data.

ETL is used to manage large amounts of data from different sources and to provide the data in a format that is usable and preferred by the enterprise. The processing and management of the ETL data can consume large amounts of resources such as processor utilization, memory capacity, etc. Also, ETL data is updated at periodic intervals such as weekly or monthly limiting the availability of the most current data.

SUMMARY

Embodiments of the present invention are directed to a computer-implemented method for detection of data offloading the instrumentation analysis. A non-limiting example of the computer-implemented method includes monitoring, via a processor, an execution of a job, and analyzing processes associated with the job to determine a pattern. The computer-implemented method also includes determining whether the pattern of the job is associated with a pattern for a workload type, and classifying the job based at least in part on the determination.

Embodiments of the present invention are directed to a system for detection of data offloading the instrumentation analysis. A non-limiting example of the system includes a data management system, a storage medium, the storage medium being coupled to a processor. The processor is configured to monitor an execution of a job, and analyze processes associated with the job to determine a pattern. The processor is also configured to determine whether the pattern of the job is associated with a pattern for a workload type, and classify the job based at least in part on the determination.

Embodiments of the invention are directed to a computer program product for detection of data offloading the instrumentation analysis, the computer program product comprising the computer readable storage medium having program instructions embodied therewith. The program instructions are executable by a processor to cause the processor to perform a method. A non-limiting example of the method includes monitoring an execution of a job, and analyzing processes associated with the job to determine a pattern. The computer-implemented method also includes determining whether the pattern of the job is associated with a pattern for a workload type, and classifying the job based at least in part on the determination.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
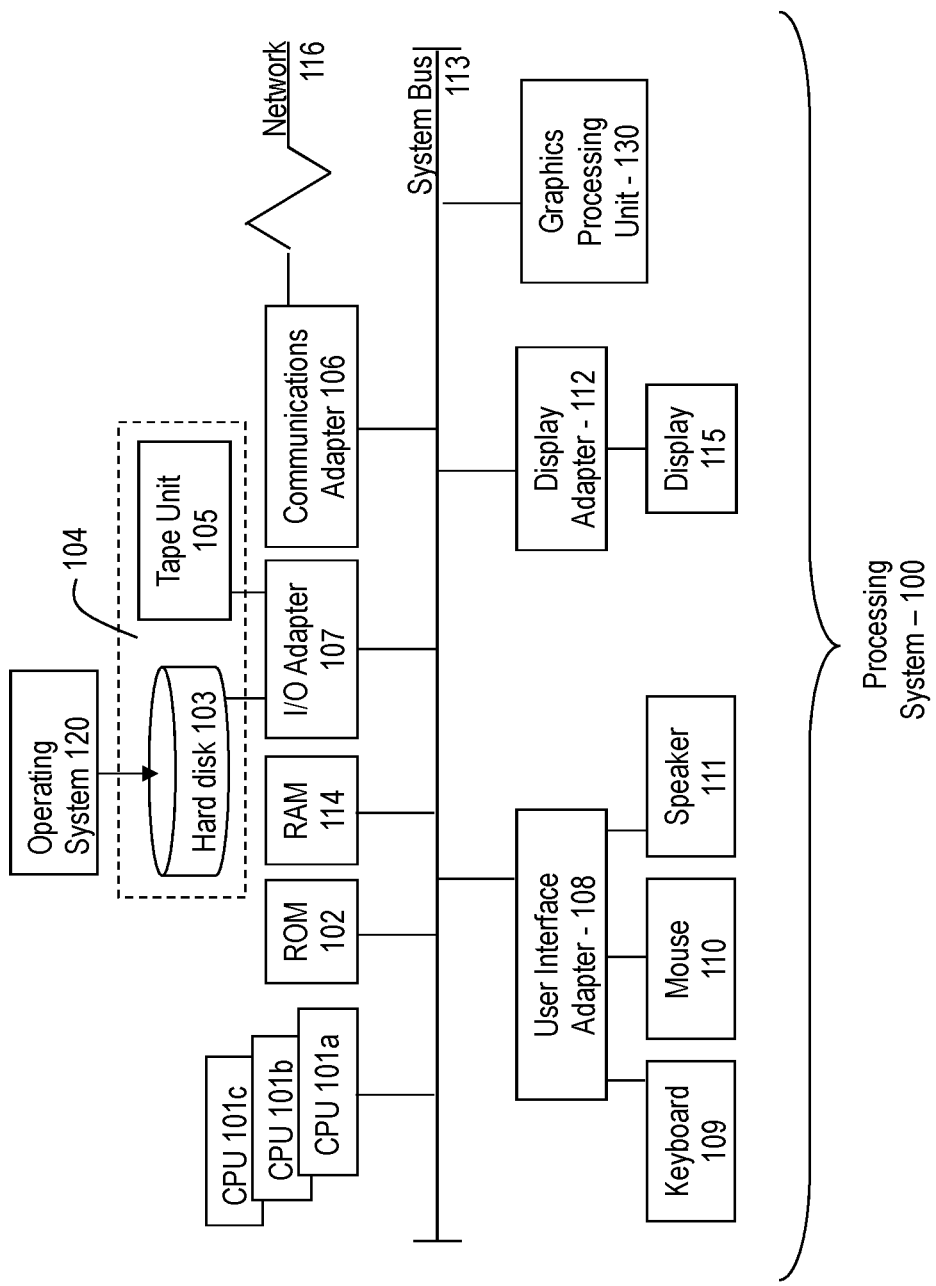
FIG. 1 depicts a block diagram illustrating one example of a processing system for practice of the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, extract, transform, and load (ETL) process is explained. ETL processing refers to a process in database usage and especially in data warehousing. ETL processing includes an extracting step to obtain data from one or more data sources such as a server, data file, etc. The next step in the ETL process is to transform the data into a different format or standard. Finally, the data undergoes a loading step where the data is provided to a target destination such as database or server.

Today there is no technology available to locate and define patterns to identify processes that are occurring in a computing system. Regarding ETL technology, solutions exist to perform ETL activities however there are no products or offerings that help identify the ETL processing being executed on a source system.

For example, system administrators are often unaware of the tasks that are occurring in the computing system. If system administrators have knowledge of the types of tasks they can configure the applications running those tasks to operate in an efficient manner. As an example, there are deployment patterns in computing systems that may not be ideally configured and are wasting resources. Patterns can be associated with the manner in which resources are accessed, the amount of resources used, the codes and/or sequence of codes that are accessed. In many cases, the teams responsible for management of the computer systems may not be aware that these patterns are being used by application teams that use their resources. For example, if the mainframe support team has knowledge that data on the platform is subject to ETL procedures, the team can potentially target specific applications with proposals to modify the deployment of the various applications to run more efficiently. However, without the knowledge of what data is subject to ETL processing, the administrators can face challenges when updating the configuration of the system and applications to optimize the processing.

Many challenges can arise during an ETL process. For example, one or more copies of data can be spread across the enterprise, it can be costly to perform the ETL data at significant volumes, the data may no longer be secured and audited as the data exists on the system of origin, and it is likely the frequency of the data offload is daily, weekly or monthly which results in stale data being used for processing. The techniques described herein provides for data management that allows for better quality of service for applications that are accessing the data. With knowledge of the task and processes being performed, system administrators can focus on these areas to improve system processing.

Turning now to an overview of the aspects of the invention, one or more embodiments of the invention address the above-described shortcomings of the prior art by providing a technique to identify workload types based on detected patterns associated with processes of a job. As a non-limiting example, the System Management Facilities (SMF) data is collecting on the mainframe z/OS platform.

The techniques described herein provide for determining whether a specific job or program being executed on a system represents a given pattern associated with a known workload type, such as an ETL based workload. This provides mainframe support teams and administrators the ability to identify opportunities to work with application teams to have them better optimize their data processing or to adjust charge backs for ETL workloads to drive different behaviors from their users.

In one or more embodiments, rules can be used to identify ETL type workloads. In another embodiment, generated models can be used to identify ETL type workloads by comparing them. In other embodiments, real-time operational data can be collected and compared to the operational data characteristics of a current task. In contrast, other embodiments can use a collection of data for previously run tasks that have been post-processed to determine which of those tasks were actual ETL workload types are and the patterns of those workloads can be used to identify ETL type workloads. In one or more embodiments, the code name of the task that is being executed may be known as an ETL task. Therefore, the task can be identified as an ETL task based on the code name. In a different embodiment, the resources that are consumed by ETL type workloads can be measured and compared to current tasks to determine if there are any existing relationships or common characteristics in resource utilization.

The above-described aspects of the invention address the shortcomings of the prior art by providing the capability to identify the patterns of currently executed tasks and classifying the tasks as a workload type based on the identified pattern. This information can be used by system administrators to target areas for increasing the efficiency of the computing system.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
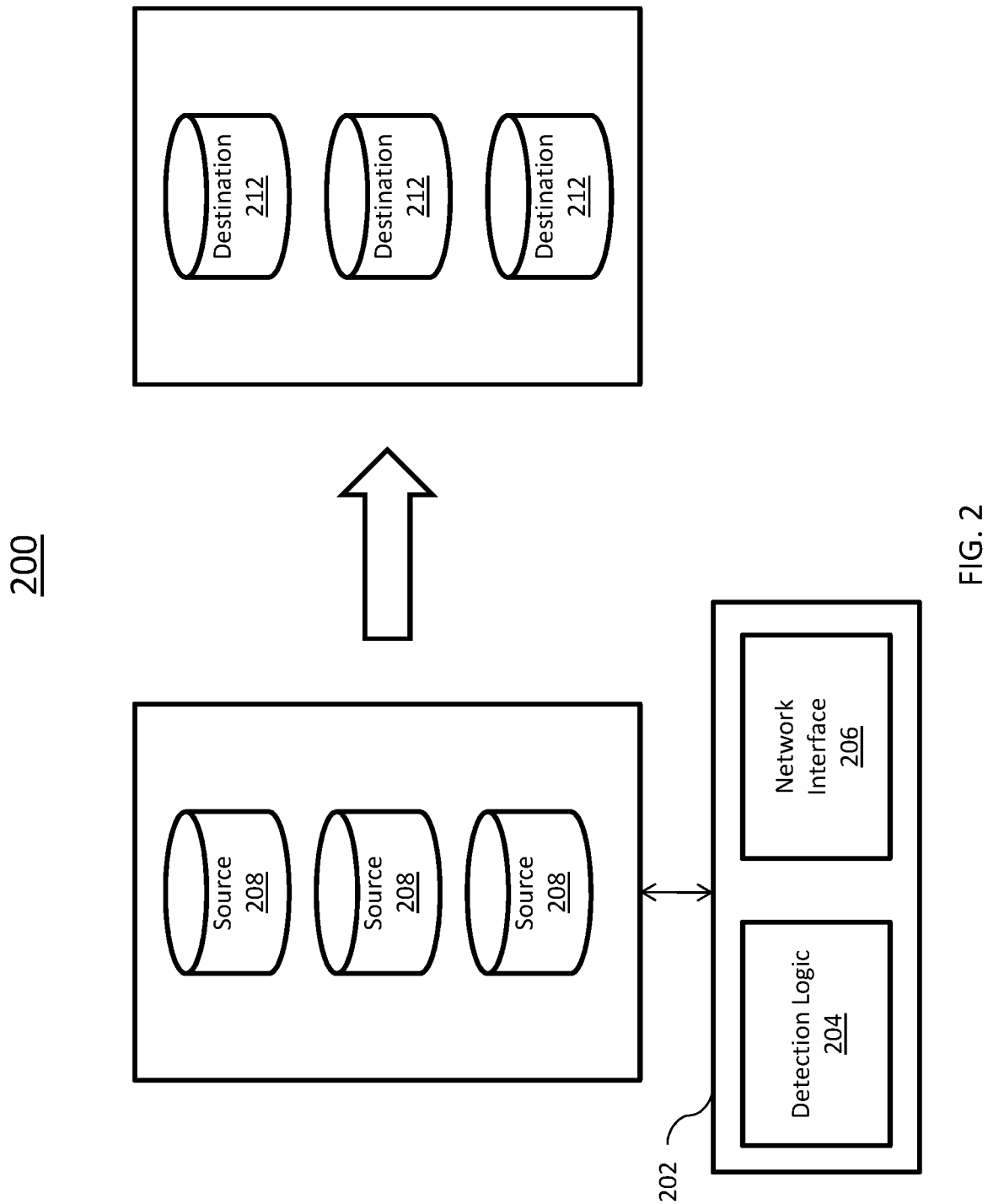
FIG. 2 depicts a system for detecting data offloading through instrumentation analysis in accordance with one or more embodiments.

Referring now to FIG. 2, a system 200 for the detection of data offloading through instrumentation analysis is provided. A data management system 202 is configured to manage and process different types of workloads. In one or more embodiments, the data management system 202 is configured to identify workloads as ETL workloads based on a detected pattern associated with the processing of a job.

The data management system 202 is capable of performing ETL tasks where data is extracted from the source device 208, transformed, and then loaded to a destination device 212. The source device 208 can be a database or server or the like. The source device can store an enterprise's data in a first format. The destination device 212 can be a database or server and the like. In an ETL process the data from the source device can be extracted, transformed to a second format, and sent to the destination device 212 as the target device.

In one or more embodiments, the data can be transmitted over a network. The data management system 202 includes a plurality of modules and processors including a detection logic 204. In one or more embodiments, the detection logic 204 can be located on one or more systems to collect data in real-time, where the collected information can be used to define and identify workload types of currently executed tasks. The data management system 202 also includes a network interface 206 for communicating over a network.

In one or more embodiments, a series of models and rules are used to provide identification of an ETL style workload. A history is required to build a machine learning classifier to generate the models and determine ETL type workloads. The model can be refreshed with new data to update/optimize the model as more information is collected for a particular workload type. In one or more embodiments, known sets of ETL tools are run where the operational data is collected and associated with those runs. Based on the collected operational data, models can be generated and then applied to other job runs to score them.

For example, rules can be used to detect code that matches the name of code that is known to perform ETL processing. In one or more embodiments, the code name associated with the jobs/tasks that are being executed may be known to be an ETL type workload. For example, the code name can be a load module name or Java class name that has been determined by the data management system. In addition, the amount of processing time spent in each code module or area can be tracked and used to identify ETL related tasks. In one or more embodiments, the code names that are subsequently discovered to be associated with ETL type workloads can be stored and used to classify jobs/tasks as ETL or non-ETL type workloads.

As a different example, rules can be used to determine whether a job performs a pattern of read/writes. ETL jobs are characterized as having many read-only I/O operations compared to write operations to a network. As a non-limiting example, a ratio of read to write operations that can be used to determine ETL type workloads can be 10/1 or 100/1. Also, read operations can read data from a disk and the write operation can write the data to a TCP/IP socket which can indicate large amounts of data from a disk is being transmitted to the network indicative of an ETL type workload. If a particular pattern based on these rules is detected, the job can be classified as an ETL type workload. These are non-limiting examples that can be expanded to include many checks as the data is made available. For example, as code is identified as being part of an ETL process the set of known code modules can be updated so that the instrumentation data can provide better matching capacity.

In one or more embodiments, a window of data is collected where the data is post-processed to determine whether any of the jobs represent ETL workloads. This data is being stored by the operating system. In an example, the system can go back and determine which jobs were ETL jobs. In one or more embodiments, after the system has determined which jobs are ETL jobs, the information can be used to build models to classify subsequently run jobs. The pattern of the subsequently run job can be compared to the models.

In one or more embodiments, an agent including detection logic can be configured on one or more systems to obtain operational data for currently executed jobs as it is made available in real-time. This allows for a more positive identification that a job is an ETL type workload as opposed to processing data in batches daily or weekly.

In one or more embodiments, after identifying an ETL workload, the data management system can calculate the amount of I/O and CPU resources consumed based on the operational data for a task. These calculations can be used to estimate the cost of the ETL process. In addition, these calculations can be used to determine whether a current job exhibits characteristics similar to a job known to be an ETL type workload or can be used to determine whether the cost of running the identified workload type is efficient or should be the application associated with the workload type be modified to achieve efficiency.

Figure 3:
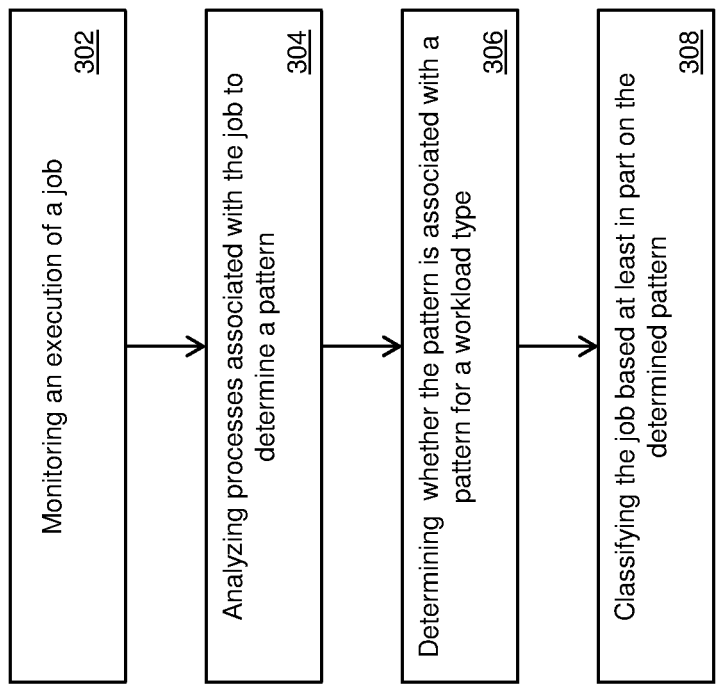
FIG. 3 depicts a flow chart for detecting data offloading through instrumentation analysis in accordance with one or more embodiments.

Now referring to FIG. 3, a method 300 for the detection of data offload through instrumentation analysis is shown. Block 302 provides monitoring an execution of a job. In an embodiment, the data management system monitors various jobs/tasks that are being run. The data management system is able to monitor different tasks. As a non-limiting example, the different tasks include ETL tasks and non-ETL tasks. These tasks can be executed in a mainframe or other computing device. In other embodiments, the data management system can generally monitor any type of workloads where profiles that are associated with the workload can be discovered. The profiles can include information such as operational data, CPU utilization, memory utilization, etc. that is characteristic of a specific workload type. After identifying the workloads, the applications for the identified workload types can be changed to optimize performance, cost, security, etc.

Block 304 provides analyzing processes associated with the job to determine a pattern associated with a workload type. In one or more embodiments, the pattern is a characteristic associated with the job.

Block 306 provides determining whether the pattern is associated with a pattern for a workload type. The patterns for different workload types can be determined by several techniques. As a non-limiting example, rules and models can be used to determine whether a pattern for a particular workload type exists. Other techniques can be used to determine patterns associated with a task for classifying the task as a workload type.

Block 308 provides classifying the job based at least in part on the determined pattern. In one or more embodiments, the job can be classified as an ETL workload type or non-ETL workload type where the classification is based on a pattern. The classification information can be transmitted to an administrator for further analysis and reconfiguration of an application associated with the job.

The technique described herein defines patterns and detects patterns and classifies a job as a particular type of workload. After the pattern has been discovered, the computing system can be configured to run more efficiently. In one or more embodiments, data that is currently collected and/or processed by the O/S is leveraged to optimize deployment behavior (system administrators, software developers). In one or more embodiments, the techniques described herein increase the efficiency of the operation of the mainframe when deploying applications data.

In addition, the computing system no longer has to wait to update a process during a batch update. Instead, the models can be updated in real time to optimize the processing of data. The described technique allows for prompt updates and optimization of models.

In an embodiment, a data management system is configured to analyze processes and transmit information related to the types of workloads that are currently running or that has run in the system. In one or more embodiments, the information is transmitted to a system and/or network administrator and further analyzed to reconfigure the system to improve the efficiency of the processes. In one or more embodiments, the described techniques can be implemented in software and/or hardware. As a non-limiting example, an agent can be deployed on one or more remote systems to collect data in real-time and transmit the data to a processor.

In addition, the detection logic can be a component of the agent that is used to gather data and determine whether a pattern exists.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for detection of data offloading through instrumentation analysis, the computer-implemented method comprising:
    building a model for identifying extract, transform, and load (ETL) workloads based on operational data collected from a set of workloads known to comprise ETL operations;
    monitoring, via a processor, an execution of a job;
    analyzing processes associated with the job to determine a pattern, wherein analyzing the processes comprises determining a number of read-only I/O operations and TCP/IP socket write operations for the job, wherein the pattern is based at least in part on a ratio of the read-only I/O operations and the TCP/IP socket write operations associated with the job;
    determining whether the pattern represents an ETL workload based on a comparison of the pattern to the model;
    classifying the job as an ETL job based at least in part on the determination of the ETL workload;
    classifying the job as a non-ETL job based at least in part on the determination of a non-ETL workload;
    responsive to classifying the job as an ETL job, collecting operational data associated with the job; and
    configuring a computing system based at least in part on the pattern to increase efficiency by modifying deployment behavior.

2. The computer-implemented method of claim 1, wherein the defined pattern is based on data collected from post-processing a set of previous jobs and classifying each job of the set of previous jobs as a specific workload type.

3. The computer-implemented method of claim 1, wherein the defined pattern is based on rules.

4. The computer-implemented method of claim 1, further comprising determining whether a code name of the job matches a code name associated with a specific workload type.

5. The computer-implemented method of claim 1, wherein the operational data is selected from the group consisting of one or more of an amount of CPU utilization, memory utilization, storage utilization, an amount of read/write traffic over TCP/IP, and a number of read/write I/Os that have been performed.

6. The computer-implemented method of claim 1, wherein the analyzing includes collecting operational data associated with the job in real-time.

7. A system for detection of data offloading through instrumentation analysis, the system comprising:
    a data management system; and
    a storage medium, the storage medium being coupled to a processor;
    the processor configured to:
        build a model for identifying extract, transform, and load (ETL) workloads based on operational data collected from a set of workloads known to comprise ETL operations;
        monitor an execution of a job;

analyze processes associated with the job to determine a pattern, analyzing processes associated with the job to determine a pattern, wherein analyzing the processes comprises determining a number of read-only I/O operations and TCP/IP socket write operations for the job, wherein the pattern is based at least in part on a ratio of the read-only I/O operations and the TCP/IP socket write operations associated with the job;

determine whether the pattern represents an ETL workload based on a comparison of the pattern to the model;

classify the job as an ETL job based at least in part on the determination of the ETL workload;

classify the job as a non-ETL job based at least in part on the determination of a non-ETL workload;

responsive to classifying the job as an ETL job, collect operational data associated with the job; and configure the system based at least in part on the pattern to increase efficiency by modifying deployment behavior.

8. The system of claim 7, wherein the defined pattern is based on data collected from post-processing a set of previous jobs and classifying each job of the set of previous jobs as a specific workload type.

9. The system of claim 7, the processor being further configured to determine whether a code name of the job matches a code name associated with a specific workload type.

10. The system of claim 7, wherein the operational data is selected from the group consisting of one or more of an amount of CPU utilization, memory utilization, storage utilization, an amount of read/write traffic over TCP/IP, and a number of read/write I/Os that have been performed.

11. A computer program product for detection of data offloading through instrumentation analysis, the computer program product comprising:

a computer readable storage medium having stored thereon first program instructions executable by a processor to cause the processor to:

build a model for identifying extract, transform, and load (ETL) workloads based on operational data collected from a set of workloads known to comprise ETL operations;

monitor an execution of a job;

analyze processes associated with the job to determine a pattern, wherein analyzing the processes comprises determining a number of read-only I/O operations and TCP/IP socket write operations for the job, wherein the pattern is based at least in part on a ratio of the read-only I/O operations and the TCP/IP socket write operations associated with the job;

determine whether the pattern represents an ETL workload based on a comparison of the pattern to the model;

classify the job as an ETL job based at least in part on the determination of the ETL workload;

classify the job as a non-ETL job based at least in part on the determination of a non-ETL workloads;

responsive to classifying the job as an ETL job, collect operational data associated with the job; and configure a computing system based at least in part on the pattern to increase efficiency by modifying deployment behavior.

12. The computer program product of claim 11, wherein the instructions are further executable by the processor to cause the processor to determine whether a code name of the job matches a code name associated with a specific workload type.

13. The computer program product of claim 11, wherein the operational data is selected from the group consisting of one or more of an amount of CPU utilization, memory utilization, storage utilization, an amount of read/write traffic over TCP/IP, and a number of read/write I/Os that have been performed.

* * * * *